Dec. 8, 1931.   L. E. WHITON   1,835,194
PLANETARY GEAR MECHANISM
Original Filed Jan. 11, 1927   2 Sheets-Sheet 1

Lucius E. Whiton
INVENTOR

ATTORNEY

Dec. 8, 1931.  L. E. WHITON  1,835,194

PLANETARY GEAR MECHANISM

Original Filed Jan. 11, 1927  2 Sheets-Sheet 2

Lucius E. Whiton
INVENTOR

ATTORNEY

Patented Dec. 8, 1931

1,835,194

UNITED STATES PATENT OFFICE

LUCIUS E. WHITON, OF NEW LONDON, CONNECTICUT

PLANETARY GEAR MECHANISM

Original application filed January 11, 1927, Serial No. 160,447. Divided and this application filed April 8, 1929. Serial No. 353,367.

My invention relates particularly to differential mechanism intended for relatively moving two members while in motion.

One object is to provide compact and reliable mechanism for moving two spindles longitudinally.

Another object is to provide self equalizing pressure means for such apparatus.

Another object is to provide means for relatively moving two concentric tubes.

This application is a division of my application Ser. No. 160,447 filed Jan. 11, 1927, now Patent No. 1,713,804 granted May 21, 1929, where the mechanism is shown as applied to lathe chucks.

Figure 1:
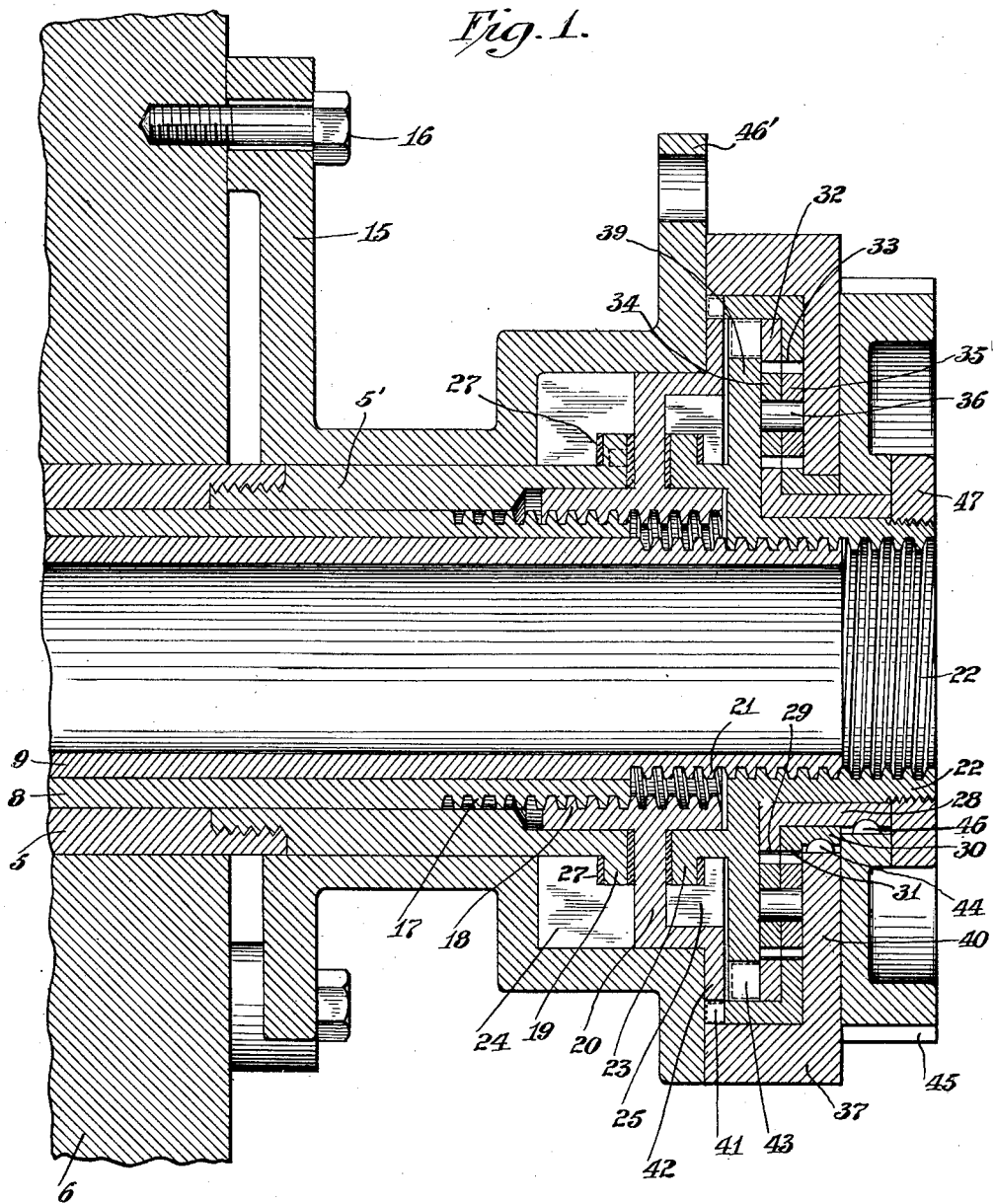
Fig. 1 is a longitudinal sectional view of the parts involving my present invention.
Figure 2:
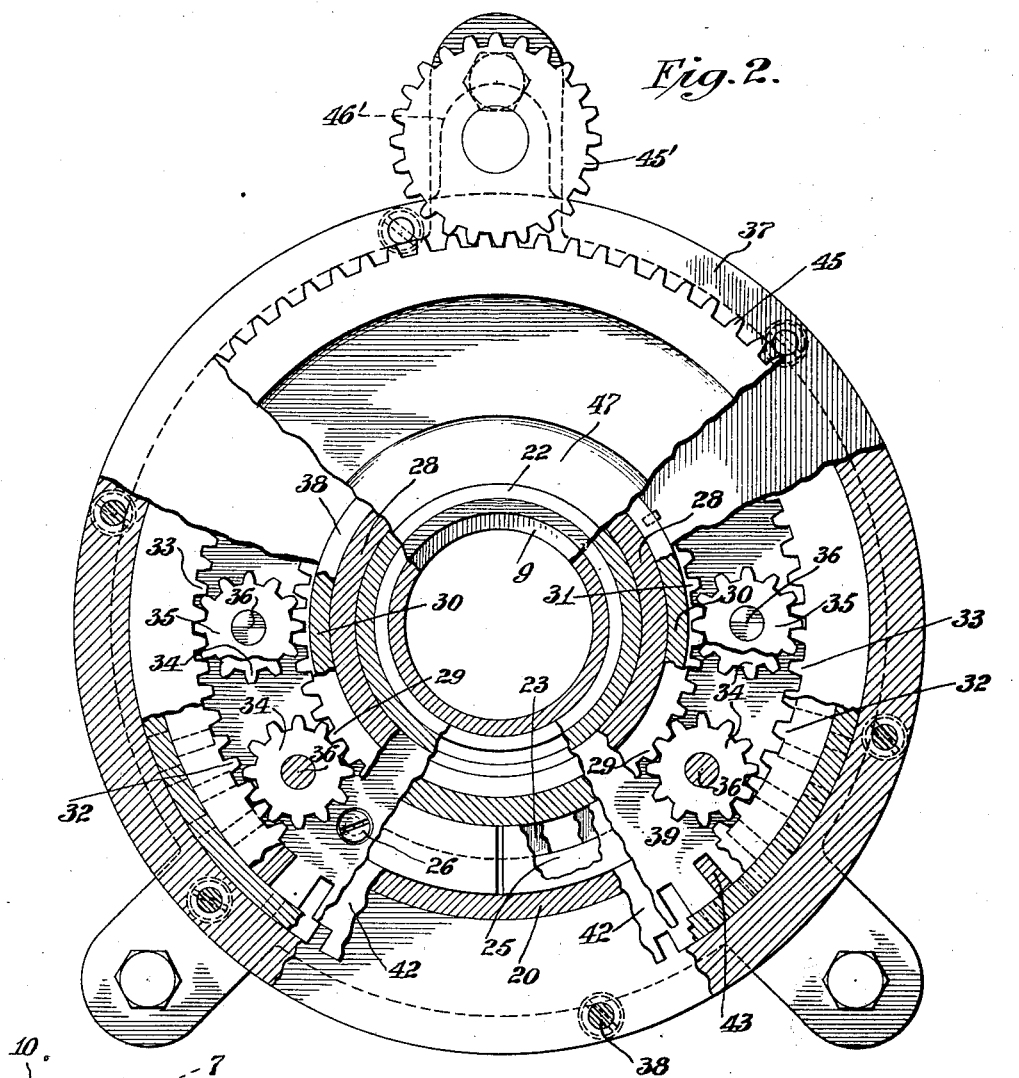
Fig. 2 is an end view and fragmentary section showing details of the mechanism.
Figure 3:
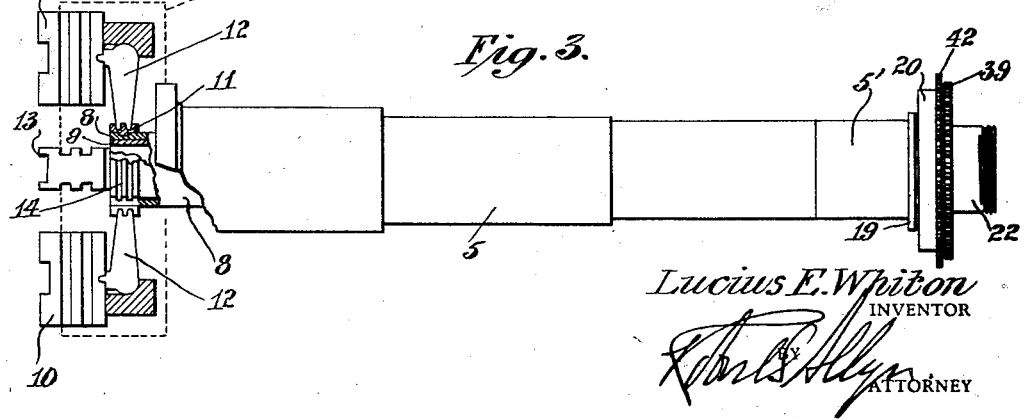
Fig. 3 is a side view and partial section showing the invention as applied to a lathe chuck for adjusting the jaws while the chuck is rotating. This will be described as one application of the invention.

The main spindle 5 is provided with an extension 5' and supported in a housing or head stock 6 and provided with a suitable detachable chuck 7. The two spindles 8 and 9 are tubular and telescopically mounted in the main spindle. The chuck has a pair of jaws 10 adapted to be actuated by the racks 11 on tube 8 and toggle rockers 12. Another pair of jaws 13 is similarly actuated from tube 9, by means of the racks 14.

The headstock 6 which supports the main spindle 5 may be of any suitable construction, depending largely upon the means provided for driving the spindle and chuck. Preferably, an extension frame 15 is provided for housing the differential gear mechanism by which the concentric spindle tubes 8 and 9 are operated. This housing extension is preferably detachably secured to the main housing, for instance, by means of bolts or screws 16 so as to facilitate manufacture, assembly and separation of the parts.

Preferably, the main spindle 5 is provided with an extension 5' which is screwed on to the rear end of the main part. The tubular member 8 is provided with a screw thread 17, on which the threaded portion of the actuating sleeve member 18 is mounted. The extension 5' is provided with a flange 19 adjacent the web portion 20 of the sleeve member.

The other tubular member 9 is also provided with a screw thread 21 on which the internally threaded sleeve 22 fits. The threads on the two tubes 8 and 9, however, are reversely directed for the purpose which will hereinafter be understood. The sleeve member 22 is provided with a flange 23 adjacent the web 20 of the sleeve member 18. Segmental rings 24 and 25 are provided which are secured to the web member 20 by means of bolts or screws 26. Suitable packing such as 27 may be provided on opposite sides of the flanges 19 and 23 to take up the longitudinal thrust when the parts are in operation.

On the sleeve 22 is concentrically mounted another ring or sleeve 28 with teeth 29, forming a spur gear. Another ring or sleeve 30 is concentrically mounted on ring 28 and provided with teeth 31 forming a spur gear similar to gear 29.

Concentric with and surrounding the spur gears are two annular gears 32 and 33. Between the spur gears and annular gears are mounted a series of pairs of pinions 34 and 35, each pair being mounted on a short stud or shaft 36 so that the pinions of a pair can rotate independently of each other on their common shaft, but so that each pair can have a planetary movement about the axis of the spindles.

These gears are all enclosed by the cap member 37 which forms a part of the frame extension or housing and is held to the frame 15 by screws 38. The sleeve member 22 is provided with a web or disc-like portion 39 opposite the corresponding wall 40 of the cap member 37 so that the pairs of planetary pinions and their stud shafts are supported between the plate or disc members 39 and 40 without requiring any additional support.

The annular gear member 33 is pivoted with an extension flange having teeth 41 which afford a clutch engagement with similar teeth on the outer edge of an extension 42 from the web 20 of the sleeve member 18 so that the annular gear member 33 and the sleeve member 18 will always rotate or stand still together.

The annular gear ring 32 also has clutch teeth 43 engaging with corresponding teeth on the outer edge of disc or web 39 of sleeve 22.

The sleeve or gear ring 30 is keyed at 44 to the cap 37 of the housing so that the gear member 31 is always stationary.

An operating member such as a gear wheel 45 is keyed at 46 to the sleeve or gear ring 28. This gear wheel 45 may be held in place by a nut 47. The gear wheel 45 may be conveniently rotated in any manner, as for instance, by means of a pinion 45', which may be supported in the lug 46' or other bearing on the frame extension.

In the operation of the chuck, the spindle 5 is driven in any suitable manner as is usual. It will be understood, of course, that the spur gear ring 31 is held stationary by the cap 37 of the extension housing or frame. During the normal working operation, the gear wheel 45 is also stationary, so that the sleeve 28 and its gear teeth 29 remain stationary alongside of teeth 31.

The rotation of the spindle 5 and the chuck body 7 carries with it the rack members 11 and 14 and the tubular spindle members 8 and 9, to which the rack members are respectively secured.

The pressure of the jaws 10 against the stock which is held by them is transmitted from the toggle or rocker levers 12, etc., the racks 11 and 14 and the tubes 8 and 9 to the screw sleeves 18 and 22 respectively, so that these sleeve members rotate with the chuck body and spindles and the annular gear members 33 and 32 are rotated accordingly.

The pairs of planetary pinions 35 and 34 are accordingly normally driven idly around the stationary spur gears 31 and 29. When it is desired to adjust the jaw members inwardly and outwardly, the gear wheel 45 is rotated in one direction or the other, as the case may be by any suitable means, so as to correspondingly rotate the sleeve 28 which is keyed to it and the spur gear 29 which is formed on the end of the sleeve 28. The rotation of the spur gear 29 with respect to the stationary gear 31 causes the pinions 34 to rotate with respect to their companions 35 so as to compel the annular gear member 32 to rotate with respect to the annular gear member 33. This produces a relative rotation of the sleeve member 22 with respect to the sleeve member 18 and the corresponding longitudinal movement of the tube 9 with respect to the tube 8. When the rack members 11 have moved as far as the parts will permit, the movement of the tube 9 longitudinally will necessarily cease, whereupon the sleeve 22 ceases to rotate and the pressure of the planetary pinions will thereupon be transmitted thru the annular gear member 33 to the flange 42 of the sleeve 18 and thereby move the tubular spindle 8 in the same direction as the tube 9 has just been moving. It will be obvious that the direction of the movement above described will be controlled by the direction of rotation of the gear wheel 45 so that the pressure applied to the jaw members will be equalized when moving inwardly or outwardly even though the article which is being gripped by the jaw members is considerably larger in one direction than it is in the plane at right angles thereto.

To take the differential gear mechanism apart the nut 47 may be removed, then the gear wheel 45, then the screws 38 and cap 37, then the sleeve and gear rings 28 and 30, then the pinions 35 and 34, and then the annular gear rings 33 and 32.

The screws 26 may then be retracted through openings in the web 39. Then the sleeve 22 may be unscrewed from the tube 9. The sleeve 18 may then be unscrewed from the tube 8. The extension 5' may then be unscrewed from the lathe spindle 5 if desired. It will be understood, also, that the chuck body may be removed from the spindle in the usual way and that the tubes 8 and 9 may be unscrewed from the sleeves 22 and 18 and removed from the left-hand end of the headstock.

Although I have described a highly desirable combination of reversible differential driving mechanism and chuck jaw operating means, it should be understood that the reversible differential adjusting mechanism might be connected or geared to the jaw members in other ways. So, also, I desire that it be understood that although it is desirable that the inner member 9 be hollow or tubular in order to permit stock or tools to be adjusted through the center of the chuck, this inner member might be solid where such central feed is not desired or necessary.

Although I have shown and described, the invention as applied to the actuation of a lathe chuck, it should be understood that I broadly claim the differential mechanism and and mechanical movement herein for general use having claimed the invention as applied to a chuck in my application 160,447 filed Jan. 11, 1927.

I claim:

1. Operating mechanism comprising a hollow main spindle, two concentric spindles mounted therein and movable with respect to each other, and differential equalizing means for moving said concentric spindles longitudinally at different times with respect to the main spindle.

2. Mechanism of the character described including a main spindle, an extension screwed on to the end thereof and having a flange, a guide frame for said spindle extension, two spindles movable longitudinally with respect to each other within said main spindle, and differential mechanism positioned longitudinally partly by said flange and partly by said guide frame.

3. Apparatus as set forth in claim 2, having a sleeve in threaded engagement with each of said longitudinally movable spindles and planetary pinions having driving connection with said sleeves.

4. Mechanism of the character described including a main spindle, a stationary housing for one end thereof, an inner spindle, a tube between the two spindles, sleeves having threaded engagements with the inner spindle and the tube, an annular gear connected to each sleeve, spur gears concentric with said annular gears, a pair of planetary pinions on a common shaft meshing with said spur and annular gears and means for rotating one spur gear with respect to the other.

5. The combination with a rotating main member, of a stationary housing for one end thereof, two rotatable actuating members in said housing, annular gear members rotatably supported in said stationary housing and having clutch engagement with said actuating members, spur gears concentric with said annular gear members, a pair of planetary pinions on a common shaft meshing between said spur gears and said annular gear members, one of said spur gears being secured to a part of said housing and means for rotating the other spur gears.

6. Mechanism of the character described including a spindle having an extension connected thereto by a screw thread and having a flange, a housing for said extension, an actuator having a web adjacent the flange on the extension, a second flanged actuator beyond the first actuator and split rings on each side of said web and overstanding the flanges on the extension and on the second actuator respectively.

7. Mechanism of the character described including a spindle in two parts, a main housing, an extension housing detachably secured to the main housing, two actuators within said housing, planetary differential mechanism for operating said actuators, a cap removably secured to said extension housing and connected to one element of said mechanism and means for rotating another element of said mechanism.

8. Mechanism of the character described including a hollow spindle, two rotatable actuators, a housing and a cap supporting said spindle and one of said actuators, a spur gear mounted on the other actuator, a second spur gear connected to said cap, annular gears connected to said actuators and a pair of planetary pinions on a common shaft meshing with said spur and annular gears and traveling between said cap and the adjacent actuator.

9. Mechanism of the character described comprising a rotary spindle, a supporting member carried by said spindle, means for securing a member on said support, and means for adjusting the latter securing means while the device is in operation including members normally rotatable with said spindle and means for transferring said normal rotatable movement to a movement longitudinal of said spindle during the rotation of said parts, whereby the securing means is adjusted.

10. Mechanism of the character described comprising a rotary spindle, a support carried by said spindle, members rockingly mounted for securing a member in the support, a tubular member mounted in said spindle and normally rotatable therewith, a second tubular member mounted in said spindle and normally rotatable therewith, a train of gearing operatively connected to said tubular members, said tubular members being so disposed relatively that operation of said gearing moves one of said tubular members along said spindle a certain distance and moves the other tubular member longitudinally upon the stopping of the longitudinal movement of the first tubular member, said tubular members being adapted to rock said rocking members for adjusting the same.

11. Mechanism of the character described comprising a rotary spindle, a support carried by said spindle, members rockingly mounted for securing a member on the support, a plurality of tubular members mounted concentrically with said spindle and normally rotatable therewith, a sleeve carried by each of said tubular members and normally rotatable therewith, a train of gearing operatively connected to the sleeve of one of said concentric members whereby said sleeve is moved longitudinally of said spindle, and a second train of gearing operatively connected to the sleeve of the other member whereby longitudinal movement is imparted to said latter tubular member upon stoppage of the longitudinal movement of said first mentioned tubular member, said tubular members being adapted upon longitudinal movement to rock said securing means for equalizing the pressure thereof on the member held thereby.

12. Mechanism of the character described comprising a rotary spindle, a support carried by said spindle, members rockingly mounted for securing a member on the support, a tubular member mounted within said spindle, a second tubular member mounted within said first mentioned tubular member, said tubular members being adapted to normally rotate with said spindle, screw threads formed on the exterior of each of said tubular members, internally screw threaded sleeves carried by each of said tubular members, the screw threads of each of said sleeves being adapted to mesh with the exterior screw threads on its respective tubular member, a gear operatively connected to one of said sleeves and adapted to move the respective tubular member supporting said sleeve along the spindle, and gearing including a series of pinions interposed between said latter sleeve and the sleeve of the other tubular member whereby movement is imparted to said latter tubular member upon the stoppage of the longitudinal movement of the former tubular member.

13. A power transmission including a rotatable member, a support therefor, means for rotating said member and support in unison, a gear for rotating said rotatable member independently of its support and said first mentioned means, a second rotatable member, a support for same, said second rotatable member and support being adapted to normally rotate in unison, and gearing interposed between said rotatable members whereby said second mentioned rotatable member is rotated independently of its support, said gearing including a series of pinions journalled in one of said rotatable members, said rotatable members being so positioned relatively that independent rotation thereof moves said rotatable members longitudinally with relation to each other.

14. Mechanism of the character described comprising a frame, a rotating spindle carried thereby, a support carried by said spindle, members rockingly mounted for securing a member on the support, a tubular member mounted within said spindle, a second tubular member mounted within said first mentioned tubular member, said tubular members being adapted to normally rotate with said spindle, means for rotating each of said tubular members independent of said spindle, said means including a train of gearing, a series of pinions interposed in said gearing for moving one of said tubular members independently of the other, a flanged plate fixed to said frame, all of said gearing positioned between said plate and frame and housed thereby, and a master gear for actuating said train of gearing.

LUCIUS E. WHITON.